United States Patent [19]

Berns

[11] Patent Number: 4,621,550

[45] Date of Patent: Nov. 11, 1986

[54] MACHINE FOR FEEDING BAR STOCK TO A TURNING TOOL

[76] Inventor: Joseph F. Berns, 1171 Georgia La., Cincinnati, Ohio 45215

[21] Appl. No.: 658,408

[22] Filed: Oct. 5, 1984

[51] Int. Cl.$^4$ .................... B23B 13/02; B23B 13/08
[52] U.S. Cl. ........................................... 82/2.5; 414/17
[58] Field of Search ................... 82/2.5, 2.7; 414/17

[56] References Cited

U.S. PATENT DOCUMENTS

| 3,927,583 | 12/1975 | Parson et al. ............................ 82/2.5 |
| 4,034,632 | 7/1977 | Lohner .................................... 82/2.5 |
| 4,406,190 | 9/1983 | Mason .................................... 414/17 |

FOREIGN PATENT DOCUMENTS 1056451  4/1959  Fed. Rep. of Germany ........ 414/17

*Primary Examiner*—Leonidas Vlachos
*Attorney, Agent, or Firm*—James W. Pearce; Roy F. Schaeperklaus

[57] ABSTRACT

A machine for supporting bar feed stock in a turning tool. The machine includes a main tube having a cylindrical inner wall and an intermediate guide tube rotatably mounted inside the main tube. The intermediate guide tube has a cylindrical outer wall and an interior elongated opening. The interior of the intermediate guide tube receives the workpiece with an end portion of the workpiece extending into a spindle of the turning tool and with the interior opening fitting closely around the bar feed stock. The intermediate guide tube is connected to the spindle to rotate therewith and with the workpiece. Liquid in the main tube surrounds the intermediate guide tube. The intermediate guide tube tends to become centered in the main tube as the spindle turns.

6 Claims, 8 Drawing Figures

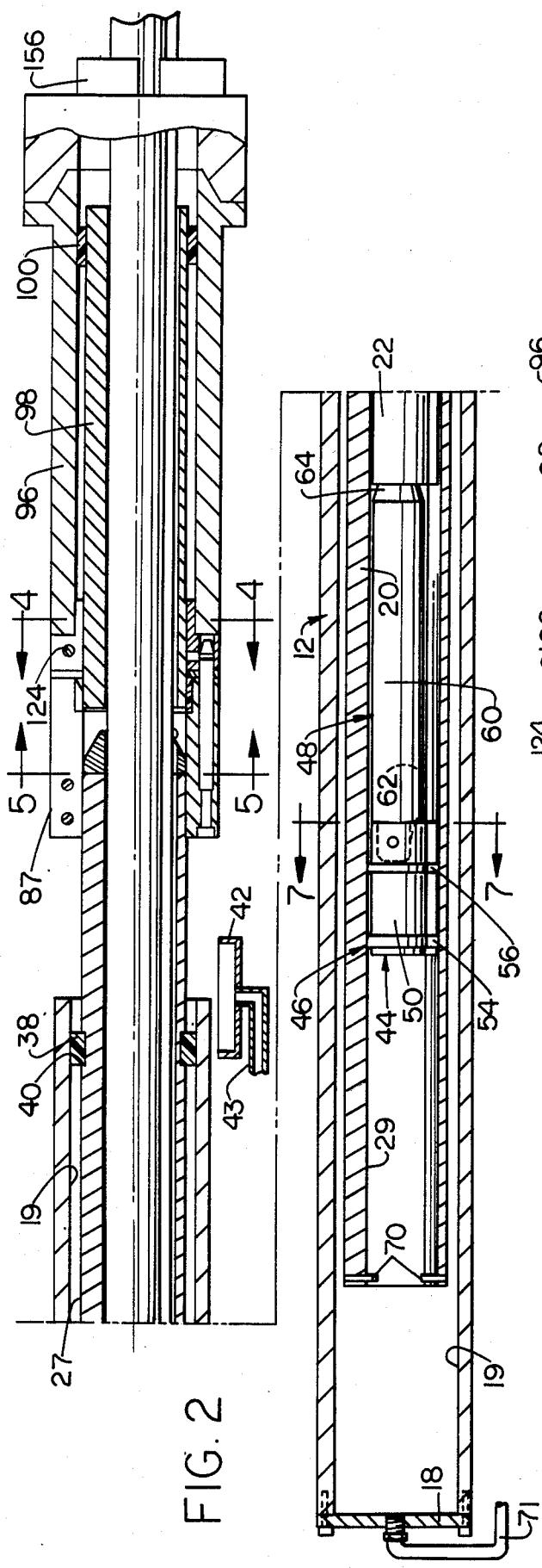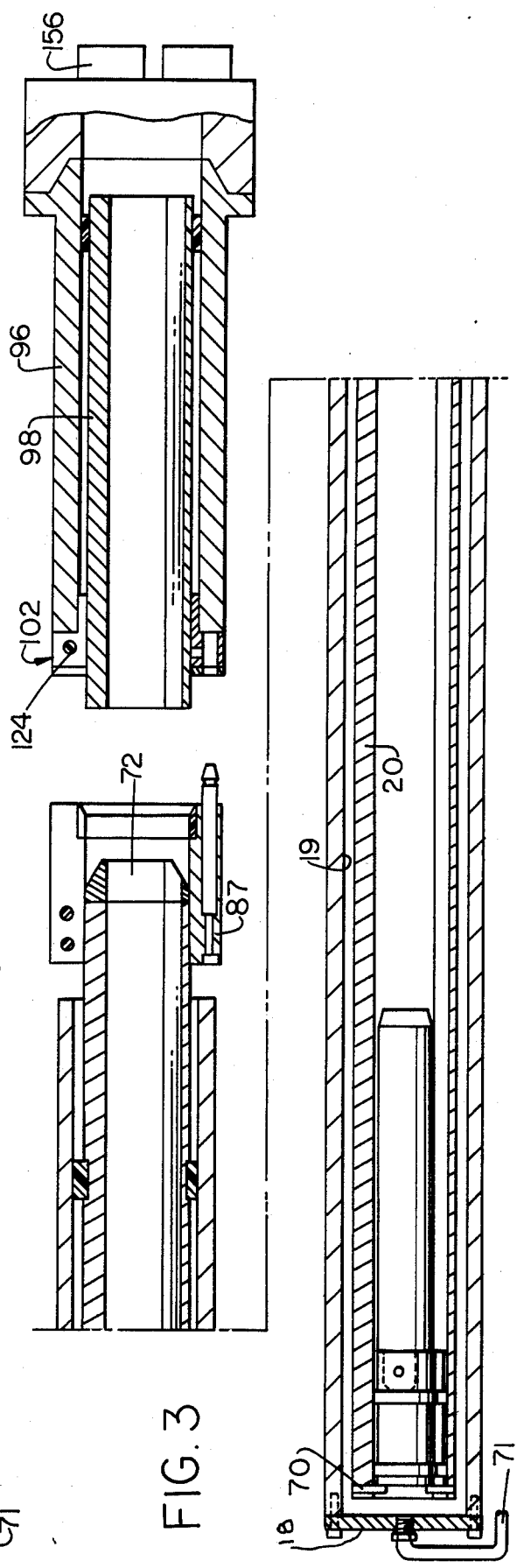

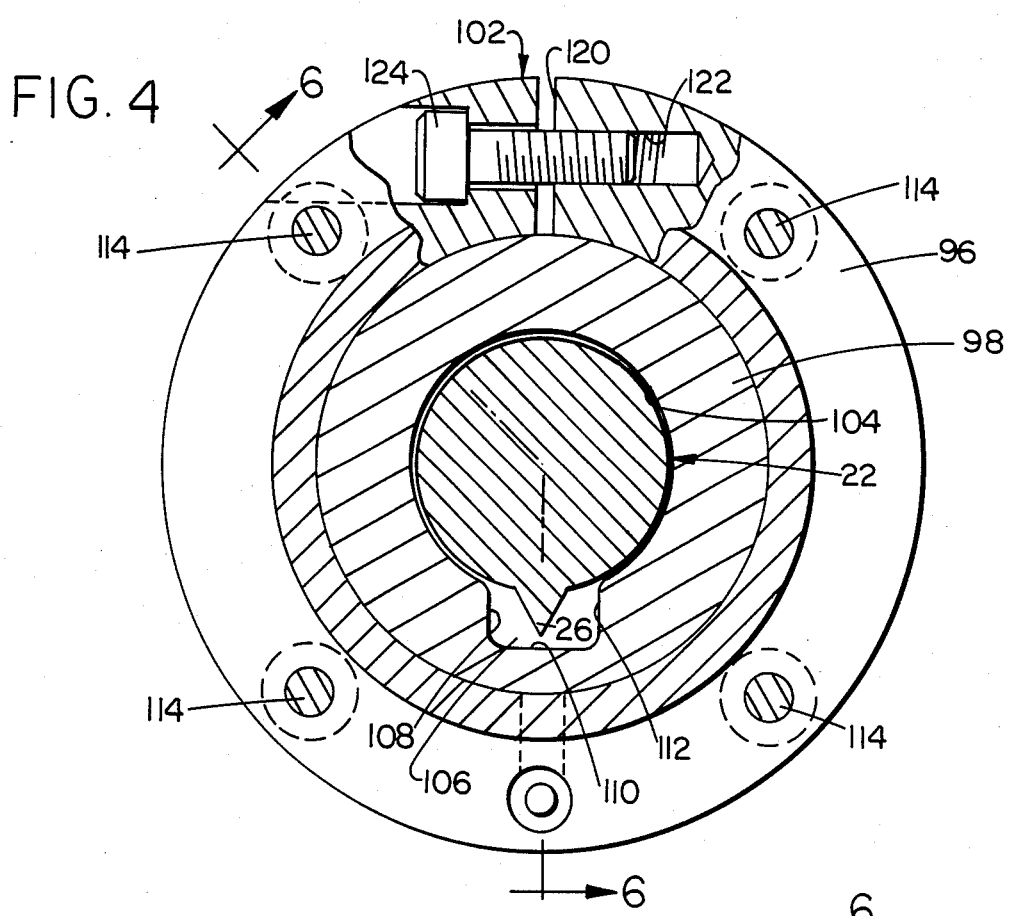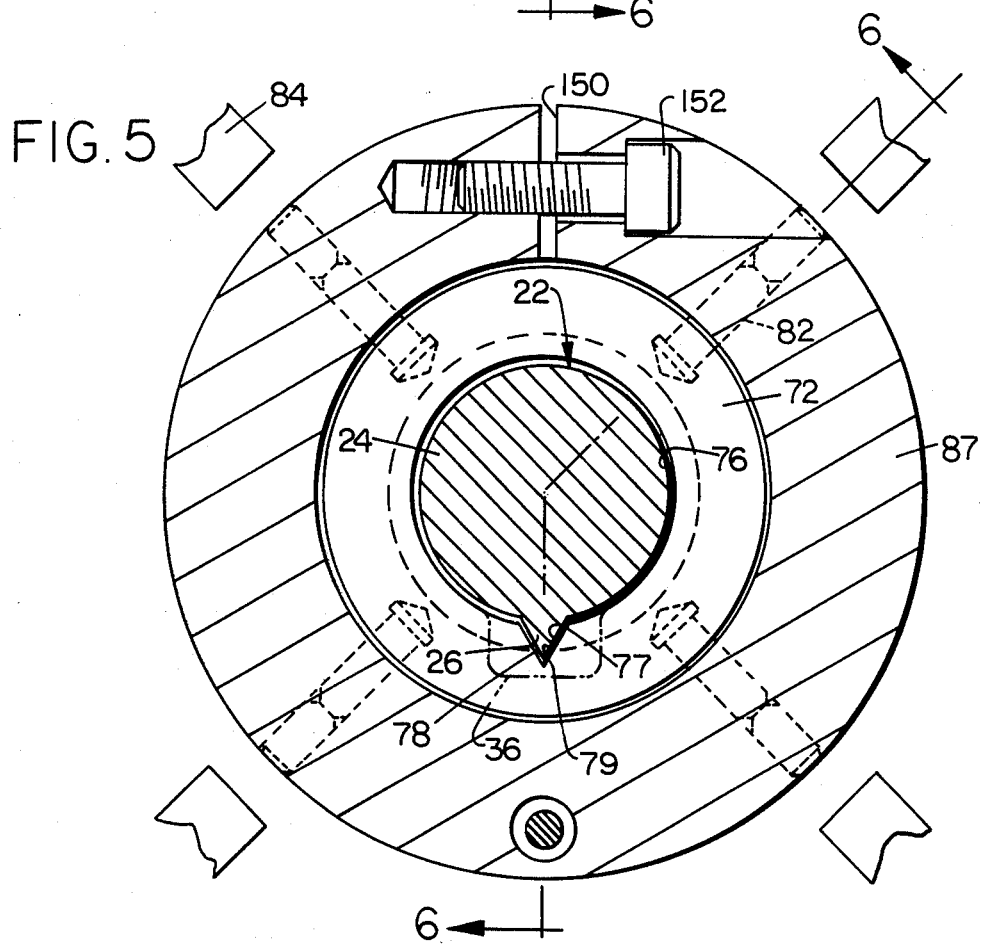

MACHINE FOR FEEDING BAR STOCK TO A TURNING TOOL

BACKGROUND OF THE INVENTION

This invention relates to a machine for feeding elongated bar stock to a turning tool and for supporting the bar stock for rotating with the tool. More particularly, this invention relates to a machine which feeds an elongated bar stock having an irregular cross section to the turning tool.

Machines for feeding bar stock to automatic machines are shown in Mariotte U.S. Pat. Nos. 2,300,457 and 2,272,720. More recent patents showing this type of machine are Scheurer U.S. Pat. No. Re. 29,905 (a reissue of U.S. Pat. No. 3,945,506), Furegati U.S. Pat. No. 4,217,800, Oliver U.S. Pat. No. 4,221,141, Neukomm U.S. Pat. No. 4,365,529 and Mason U.S. Pat. No. 4,406,190.

A rotating bar feed stock which is of round cross section can be supported in a liquid bath inside a chamber filled with the liquid. However, if the bar feed stock has an irregular cross section, or has an irregularity or projection, the turning of the bar stock in the liquid can result in the projection engaging the wall of the chamber to be distorted or worn away.

An object of this invention is to provide a chamber and liquid bath arrangement which can support a rotating bar feed stock of irregular cross section as the stock turns without damage to the irregularity of the cross section.

BRIEF SUMMARY OF THE INVENTION

Briefly, this invention provides a bar feed machine for supporting bar feed stock having an irregular cross section which includes an elongated chamber having a cylindrical inner surface. An intermediate guide tube rotates inside the cylindrical surface of the chamber. The guide tube can have an outer cylindrical surface and an interior bore or opening which receives the bar stock. The intermediate guide tube turns with the bar stock inside liquid in the chamber. The outside of the bar stock substantially conforms to the interior of the guide tube. The bar stock and the intermediate guide member turn together in the liquid in the chamber.

The above and other objects and features of the invention will be apparent to those skilled in the art to which this invention pertains from the following detailed description and the drawings, in which:

BRIEF DESCRIPTION OF THE DRAWINGS

FIG. 2 is a view in upright section of the machine shown in FIG. 1, the drawing being divided into two sections, a double-dot-dash line showing the interface between sections, the machine being shown in advanced operational position, supports and oil collecting units being omitted or shown schematically for clarity;

FIG. 3 is a view in upright section of the machine shown in FIGS. 1 and 2, the drawing being divided into two sections, a double-dot-dash line showing the interface between sections, the machine being shown in retracted loading position;

FIG. 4 is a view in section taken on an enlarged scale generally on the line 4—4 in FIG. 2;

FIG. 5 is a view in section taken on an enlarged scale generally on the line 5—5 of FIG. 2, a slot in an intermediate guide member being shown in double-dot-dash lines;

DESCRIPTION OF THE PRESENTLY PREFERRED EMBODIMENT

Figure 1:
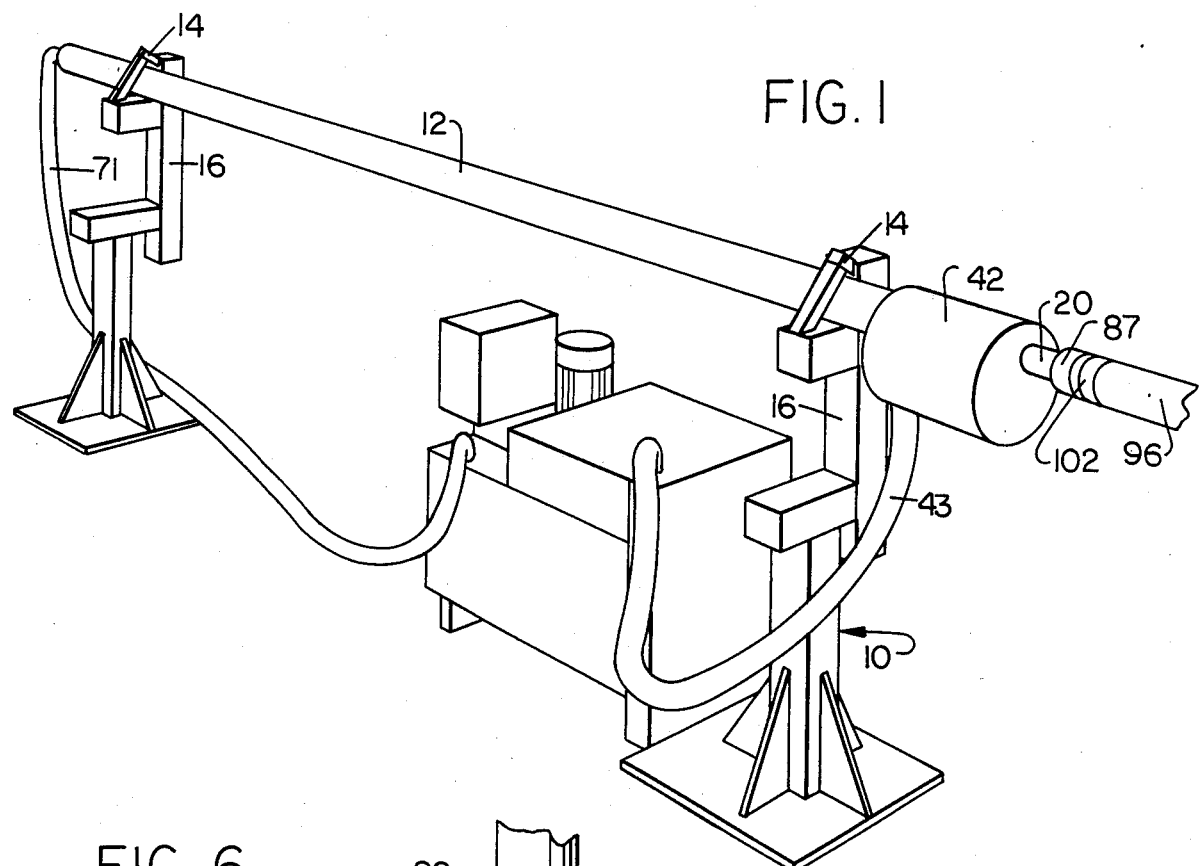
FIG. 1 is a perspective view of a bar feed stock supporting machine constructed in accordance with an embodiment of this invention.

In the following detailed description and the drawings, like reference characters indicate like parts.

In FIG. 1 is shown a bar stock feeding machine 10, which is constructed in accordance with an embodiment of this invention. The machine 10 includes an elongated main tube or chamber 12 which is carried by releasable clamps 14 mounted on supports 16. A cap plate 18 closes a left hand end of the main tube or chamber 12, as shown in FIGS. 2 and 3. An interior wall 19 of the main tube 12 is cylindrical.

The main tube 12 supports an intermediate guide tube 20 and a workpiece 22. The workpiece 22 can be an elongated bar as shown in FIG. 2 and can be of irregular cross section as shown in FIGS. 4 and 5, having a body 24 of substantially cylindrical shape and a lengthwise rib 26 extending outwardly from one side thereof.

Figure 7:
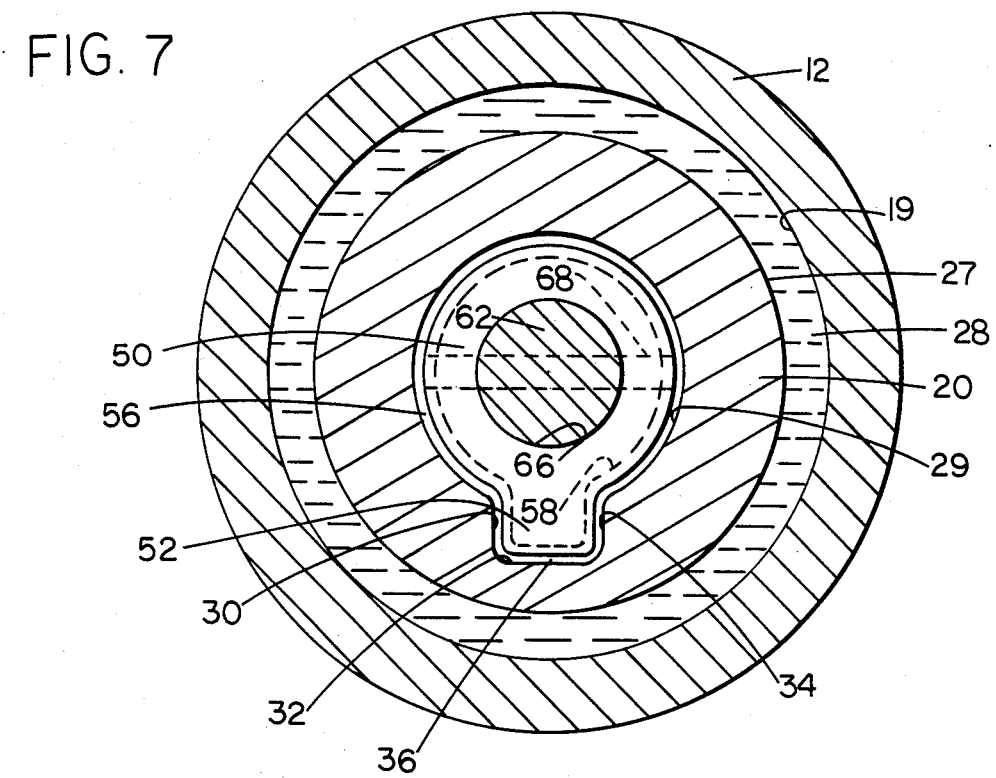
FIG. 7 is a view in section taken on the line 7—7 in FIG. 2.

As shown in FIG. 7, the intermediate guide tube 20 is rotatably mounted inside the main tube 12. An outer wall 27 of the intermediate guide tube 20 is cylindrical. The main tube 12 is filled with oil 28 or the like, which fills the space between the main tube 12 and the intermediate guide tube 20. The interior of the intermediate guide tube 20 includes a main wall 29 of cylindrical form and walls 30, 32 and 34, which form a slot 36 parallel to and extending radially outwardly from the main wall 29. The workpiece 22 is received inside the intermediate guide tube 20 with the body 24 of the workpiece 22 received inside the main wall 29 and the rib 26 received in the slot 36. An annular seal ring member 38 is received in an annular slot 40 in the outer wall 27 of the intermediate guide tube 20 and engages the interior wall 19 of the main tube 12 to retain oil in the space between the interior wall 19 of the main tube 12 and the outer wall 27 of the intermediate guide tube 20 inside the cap plate 18. Any oil which escapes is caught in an oil recuperator 42 and returned through a line 43 to an oil sump, not shown in detail.

A pusher assembly 44 is mounted inside the intermediate guide tube 20 and can reciprocate therealong. The pusher assembly includes a piston member 46 and a pusher member 48. The piston member 46 includes a body 50, which is of generally cylindrical form and is received inside the main wall 29 of the intermediate guide tube 20. The piston member 46 also includes an outwardly projecting tongue portion 52, which is received in the slot 36. Seal rings 54 and 56 are received in slots 58 in the piston member 46 to form seals between the piston member 46 and the interior of the intermediate guide tube 20. The pusher member 48 includes a cylindrical body 60 having a head 62 at one end and a frusto-conic tip 64 at an opposite end. The head 62 is received in a socket 66 in the piston member 46. A pin 68 is received in transverse openings in the head 62 and in walls of the socket 66 to lock the piston member 46 and the pusher member 48 in assembled relation. Radially extending pins 70 at the left hand end portion of the intermediate guide member 20 limit sliding of the pusher assembly to the left as shown in FIGS. 2 and 3. Fluid under pressure can be introduced into the left hand end of the main tube 12 through a line 71 to urge the pusher assembly 44 to the right, as shown in FIGS. 2 and 3. The right hand end of the frusto-conic tip 64 of the pusher member 48 bears on the workpiece 22 to cause advance of the workpiece 22 to the right when fluid under pressure is introduced through the line 71.

Figure 6:
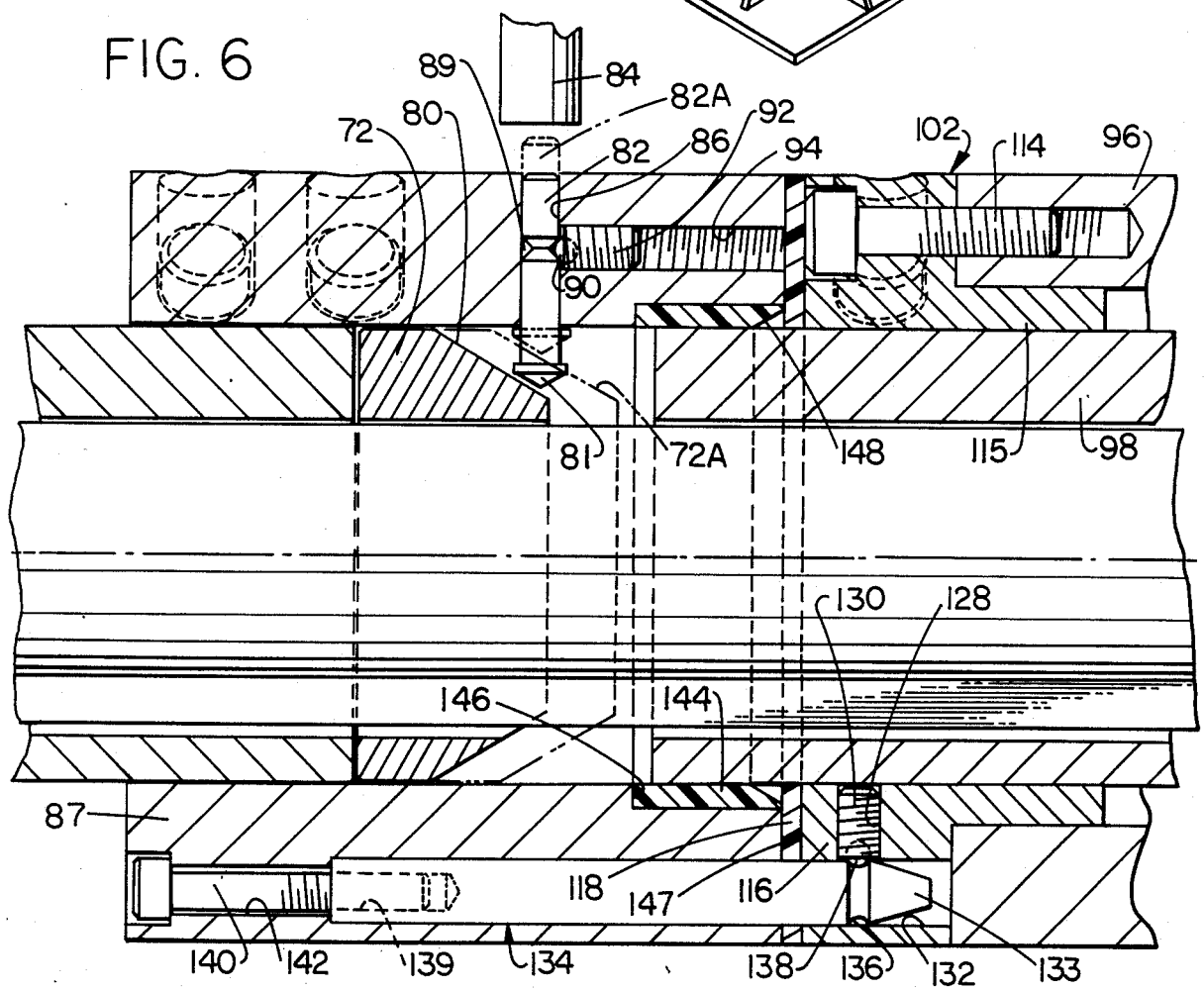
FIG. 6 is a view in section taken generally on the line 6—6 in FIG. 4.
Figure 8:
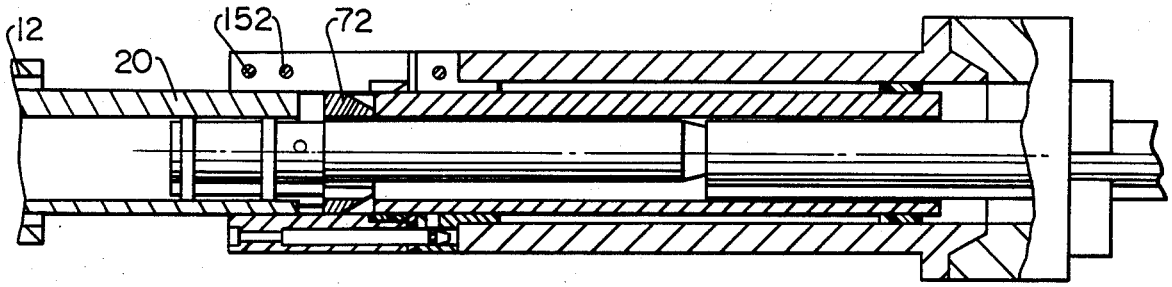
FIG. 8 is a fragmentary view in upright section of the machine.

A stop collar member 72 is slideably mounted inside a main coupling member 87. The stop collar member 72 includes an interior opening which receives the workpiece 22 and conforms closely to the wall of the workpiece 22 and includes a main cylindrical wall 76 and an outwardly extending slot 77. The slot 77 conforms to the rib 26 and is defined by intersecting walls 78 and 79. When the piston member 46 reaches the stop collar member 72, the tongue portion 52 engages the stop collar 72 to advance the stop collar 72 to the right as shown in FIGS. 6 and 8. The stop collar 72 includes a frusto-conic wall or face 80 which engages conic heads 81 of radially extending pins 82 to advance the pins radially outwardly as shown in FIGS. 5 and 6. The pins 82 move into close proximity with proximity switches 84 to cause actuation of the proximity switches to provide an indication that substantially all of the workpiece 22 has been consumed. The pins 82 move in radial bores 86 in the main coupling member 87. The main coupling member 87 is mounted on the intermediate guide tube 20. The main coupling member 87 is provided with a lengthwise radial slot 150. Bolts 152 can draw the main coupling member 87 tightly against the intermediate guide tube 20. Each of the pins 82 is provided with a circumferential slot 89. A spring pressed ball 90 is held against the pin by a fitting 92 (not shown in detail) mounted in a lengthwise threaded bore 94. The ball 90 can engage the pin 82 at the slot 89 for normally holding the pin 82 in the full line position of FIG. 6. When the stop collar member 72 advances from the full line position of FIG. 6 to the double-dot-dash line position 72A, the pin 82 is advanced from its full line position to the double-dot-dash line position 82A to bring an outer end portion of the pin 82 into close proximity with the associated one of the proximity switches 84.

The intermediate guide tube 20 can be caused to turn with a lathe spindle 96. The lathe spindle 96 can be of usual form and is shown only schematically in FIGS. 2 and 3. A spindle reduction tube 98 is mounted inside the lathe spindle 96 by means of a ring 100 mounted on the spindle reduction tube and a secondary coupling member 102. The inside of the spindle reduction tube 98 is similar in cross section to the interior of the intermediate guide tube 20 and includes a generally cylindrical wall portion 104 and a radial slot portion 106 having walls 108, 110 and 112 (FIG. 4).

The secondary coupling member 102 includes an inner ring portion 115, which fits between the lathe spindle 96 and the spindle reduction tube 98, a head portion 116, which extends outwardly from the spindle reduction tube 98, and a gasket member 118 of resilient plastic material such as that commonly called nylon. The secondary coupling member 102 and the gasket member 118 are slotted as indicated at 120. A transverse bore 122 intersects faces of the slot 120 and receives a bolt 124, which draws the secondary coupling 102 tight on the spindle reduction tube 98. Bolts 114 can be provided for attaching the secondary coupling 102 to the lathe spindle 96. A radial threaded bore 128 is provided in the secondary coupling member 102 for holding a spring pressed detent 130. A lengthwise bore 132 in the secondary coupling member 102 intersects the radial bore 128 and can receive a frusto-conic head portion 133 of a drive pin 134. A circumferential slot 136 in the drive pin 134 can receive a ball 138 of the spring pressed detent 130.

The drive pin 134 has a socket 139 in a head portion thereof which receives a mounting bolt 140 for mounting the drive pin 134 in a doubly counterbored bore 142 in the main coupling member 87. A gasket 144 is mounted in a socket 146 in the main coupling member 87 and engages the exterior of the spindle reduction tube 98 and an upright face 147 of the gasket member 118 when the machine is in operation to provide a coupling between the spindle reduction tube 98 and the intermediate guide tube 20 which can yield sufficiently to accommodate minor irregularities of alignment. A beveled edge 148 of the gasket 144 assists in directing the gasket 144 into position surrounding the spindle reduction tube 98 as shown in FIG. 6.

Operation

When the workpiece 22 is to be loaded in the bar stock feeding machine 10, the intermediate guide tube 20 and the main coupling member 87 are withdrawn to the position shown in FIG. 3 and the clamps 14 (FIG. 1) can be released to allow sufficient movement of the main tube 12 to permit entry of the workpiece 22 as shown in FIG. 2. The clamps 14 are fastened to hold the main tube 12 in place on the supports 16, and the intermediate guide tube 20 together with the main coupling member 87 and the drive pin 134 are advanced to cause the frusto-conic head portion 133 of the drive pin 134 to enter the lengthwise bore 132 in the secondary coupling member 102. The drive pin 134 is advanced to the FIG. 6 position at which the ball 138 of the spring pressed detent 130 is received in the circumferential slot 136 of the drive pin 134.

Fluid under pressure is supplied through the line 71 to cause advance of the workpiece 22 as required, and a chuck 156 (not shown in detail) of the lathe spindle 96 is tightened to hold the workpiece 22 as the lathe spindle 96 is turned by lathe mechanism (not shown in detail). The portion of the intermediate guide tube 20 to the left of the seal ring member 38 rotates in a bath of fluid and tends to become centered inside the main tube 12 as the intermediate guide tube 20 rotates. When lathe operations have been completed on a first portion of the workpiece, the lathe chuck 156 can be released and further pressure through the line 71 causes advance of a new portion of the workpiece 22 into position for holding by the lathe chuck 156. Then the chuck 156 is again tightened, and the operation is repeated. When a last portion of the workpiece is advanced into the spindle reduction tube 98, the piston member 46 being slightly larger than the inside dimensions of the stop collar 72, engages the stop collar 72 to cause advance of the stop collar 72 to the double-dot-dash line position 72A of FIG. 6 to cause the pins 82 to move to their outwardly extended position 82A to cause actuation of the proximity switches 84 to indicate that a new workpiece is required.

The bar stock feeding machine illustrated in the drawings and described above is subject to structural modification without departing from the spirit and scope of the appended claims.

Having described my invention, what I claim as new and desire to secure by Letters Patent is:

1. A machine for supporting a bar feed stock workpiece having a non-circular cross-section in a turning tool which comprises a main tube having a cylindrical inner wall, an intermediate guide tube rotatably mounted inside the main tube, the intermediate guide tube having a cylindrical outer wall, the intermediate guide tube having an elongated interior opening receiving the workpiece with an end portion of the workpiece extending into a spindle of the turning tool and with the interior opening fitting closely around the bar feed stock workpiece, means for connecting the intermediate guide tube to the spindle to rotate therewith and with the workpiece, means for holding liquid in the main tube surrounding the intermediate guide tube, the intermediate guide tube moving toward centered position in the main tube as the spindle turns with the intermediate guide tube and the workpiece, means in said intermediate guide tube to advance the workpiece, and liquid means under pressure to supply said advancing means and fill the main tube.

2. A machine as in claim 1 wherein said advancing means includes a pusher assembly mounted in the intermediate guide tube for movement lengthwise thereof, the pusher assembly including a piston member working in the intermediate guide member and a pusher member which can bear on the workpiece to move the workpiece lengthwise of the intermediate guide tube.

3. A machine as in claim 2 which includes a stop collar mounted on the workpiece for movement lengthwise thereof, in which the piston member is engageable with the stop collar to advance the stop collar lengthwise of the workpiece and which includes a switch means operated by the stop collar to indicate advance of an end of the workpiece to a discharge position.

4. A machine as in claim 3 in which the stop collar has a frusto-conic face, the frusto-conic face bears on switch actuating pin means which is mounted for moving transversely of the spindle, and the switch means is a proximity switch actuated by the switch actuating pin means.

5. A machine as in claim 4 in which the pin means is provided with conic head means engageable with the frusto-conic face of the stop collar.

6. A machine for supporting a bar feed stock workpiece having a non-circular cross-section in a turning tool which comprises a main tube having a cylindrical inner wall, an intermediate guide tube rotatably mounted inside the main tube, the intermediate guide tube having a cylindrical outer wall, the intermediate guide tube having an elongated interior opening receiving the workpiece with an end portion of the workpiece extending into a spindle of the turning tool and with the interior opening fitting closely around the bar feed stock, means for connecting the intermediate guide tube to the spindle to rotate therewith and with the workpiece, means for holding liquid in the main tube surrounding the intermediate guide tube, the intermediate guide tube moving toward centered position in the main tube as the spindle turns with the intermediate guide tube and the workpiece, means in said intermediate guide tube to advance the workpiece, liquid means under pressure to supply said advancing means and fill the main tube.

* * * * *